Jan. 30, 1962 W. C. BELK 3,018,808
METHOD OF SECTIONIZING GRAPEFRUIT
Filed April 23, 1958
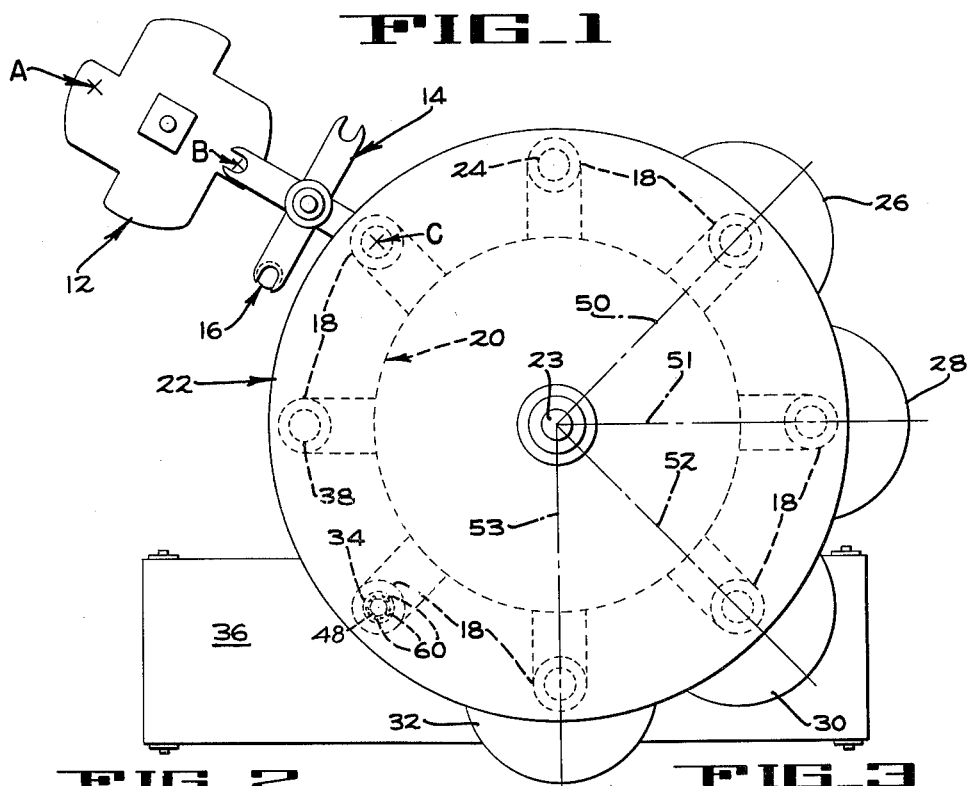
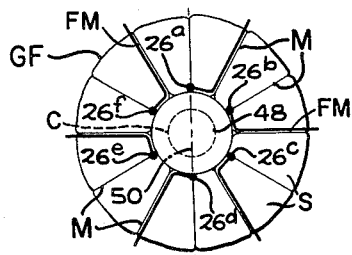
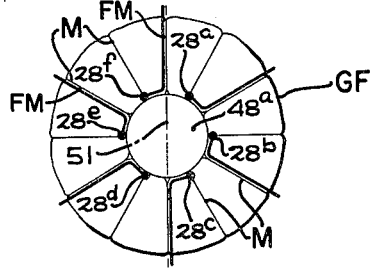
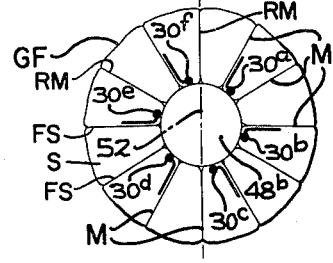
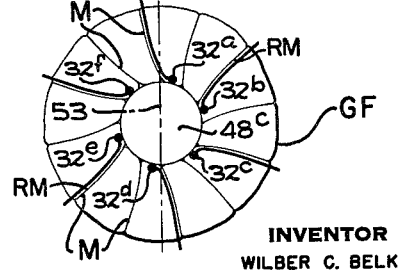
INVENTOR
WILBER C. BELK
BY Hans G. Hoffmeister.
ATTORNEY United States Patent Office 3,018,808
Patented Jan. 30, 1962

3,018,808
METHOD OF SECTIONIZING GRAPEFRUIT
Wilber C. Belk, Lakeland, Fla., assignor to FMC Corporation, a corporation of Delaware
Filed Apr. 23, 1958, Ser. No. 730,299
6 Claims. (Cl. 146—236)

The invention pertains to the processing of fruit and more particularly relates to a method of sectionizing grapefruit.

In the citrus fruit industry "sectionizing" is an operation by which the naturally-shaped membrane-free meat segments are removed from citrus fruit, particularly grapefruit, and this operation is generally performed by first peeling off the outer skin and albedo, subjecting the fruit to a hot lye treatment to remove the outer membrane from the segments, and stripping individually the segmental juice sac groups from their radial membranes.

While this stripping operation is usually carried out manually by inserting a blade between the meat segment and each radial membrane and cutting the meat segment loose, machines have been proposed for carrying out the operation. Such machines usually consist of a plurality of blades which are moved downwardly into the grapefruit in a direction parallel to the axis of the grapefruit and at a position close to the core of the grapefruit. When each blade has penetrated through the grapefruit, it is moved radially outwardly of the grapefruit to and past the periphery thereof to cut a meat segment loose from one of the radial membranes enclosing it.

When the first set of blades have completed their cutting operation, a second set of blades is inserted axially into the grapefruit and then moved radially outwardly to cut other meat segments from adjacent radial membranes. This operation is repeated a sufficient number of times to make certain that each membrane is cut loose from the radial membranes encircling it. To efficiently operate these blades it is necessary that the grapefruit be maintained in a compact form during the radially outward movement of the blades. It has been found, however, that after one or two sets of blades have been moved into and through the grapefruit the sections become loosened from each other and the subsequent insertion and cutting operation of another set of blades is made impossible. It is therefore desirable that means be provided for maintaining each grapefruit in a compact condition until all of the necessary cutting operations have been completed.

Accordingly, it is an object of the present invention to provide an improved method of maintaining a grapefruit in a compact condition during a sectionizing operation.

Another object of the present invention is to provide an improved method of sectionizing grapefruit.

Other and further objects and advantages of the present invention will become apparent from the following description taken in connection with the accompanying drawings, in which:

FIG. 1 is a diagrammatic plan view of a grapefruit sectionizing machine which may be used in carrying out the method of the present invention.

FIGS. 2, 3, 4 and 5 are schematic views showing the movement of the blades of the first, second, third and fourth sectionizing heads used in the machine of FIG. 1.

In the grapefruit sectionizing machine illustrated in FIG. 1, peeled and treated grapefruit are placed, one at a time, on a feed turret 12 (FIG. 1) at station A of the turret. The turret 12 is intermittently moved through 90° angular increments in a clockwise direction to bring each grapefruit to a transfer station B where the grapefruit is automatically transferred from the feed turret 12 to a transfer turret 14 which is also arranged to be intermittently moved in 90° increments in synchronism with the movements of feed turret 12, but in a counterclockwise direction. Each grapefruit is then moved to a position of vertical alignment with a first seed disturbing unit 16 and then to a transfer station C where it is deposited in one of a plurality of fruit carriers 18 that are mounted in uniformly spaced relation on a main fruit processing turret 20. The main turret 20 is disposed below a vertically reciprocable tool carrier 22 and is arranged to be intermittently moved through 45° angular increments in a clockwise direction about the axis of a center shaft 23 to move the grapefruit successively into positions of vertical alignment with a second seed disturbing unit 24, and sectionizing heads 26, 28, 30, and 32, which are carried by and project downwardly from the tool carrier 22. Each head has a plurality of blades arranged to be moved down into a grapefruit to separate wedge-shaped meat segments S (FIG. 2) from the grapefruit core C and from the radial membranes M. After being processed by the fourth head 32, the sectionized grapefruit, with the separated meat segments disposed loosely around the core, is brought under a rotary spinner or stripper unit 34 which projects downwardly from the tool carrier 22 and is arranged to warp the radial membranes of the grapefruit around the stationary core, causing any remaining bond between the membranes and the segments to be completely broken and causing the segments to drop onto a discharge conveyor 36. The core is then moved to a position under a core stripping unit 38 which is mounted in depending relation on the tool carrier and is arranged to be moved downwardly with the tool carrier to grip the core and remove it from the associated carrier 18.

The construction and operation of this machine is described in the application of Hans W. Grotewold, Serial No. 730,335 which was filed on April 23, 1958 and assigned to the assignee of the present application.

Each of the sectionizing heads of the Grotewold machine comprises a plurality of downwardly projecting blades which are arranged to be moved downwardly toward a grapefruit held in one of the carriers 18. Each blade penetrates the grapefruit and passes into the grapefruit in a direction generally parallel to the axis thereof and closely adjacent the apex of a pie-shaped meat segment S which is enclosed by two radial membranes and has two radial faces FS on opposite sides of the segment, each radial face being joined to the adjacent associated membrane by a natural bond. The blade is then moved toward one of the radial membranes and then radially outwardly along the membrane to and past the periphery of the grapefruit.

The present invention particularly concerns a method of sectionizing a grapefruit by making the above mentioned radial cuts to separate the meat segments from the radial membrane. Since the method may be carried out by using the Grotewold machine as well as manually, it will be described with reference to FIGURES 2, 3, 4 and 5, each of which illustrates the movement of the blades of one of the four heads of the machine as they move down into and radially outwardly through a grapefruit GF held in one of the fruit carriers 18.

In FIGURE 2 the blades of sectionizing head 26 are shown diagrammatically and are indicated by dots 26a, 26b, 26c, 26d, 26e, and 26f. These blades are disposed at 60 degree intervals in a circular pattern around a central cylindrical fruit hold-down member 48 with the blade 26a disposed in a plane 50 which, as seen in FIG. 1, extends radially from the axis of rotation of the turret 20 through the center of the cylindrical fruit hold-down member 48 carried by the head. The blades have a flat side face disposed substantially against the cylindrical surface of the member 48 and means are provided for moving the blades to an initial position grouped around the hold-down member. When the tool carrier 22 is moved downwardly, the blades penetrate into the grapefruit at the apices of the meat segments and are then moved clockwise (FIG. 2) in a direction generally tangent to the cylindrical hold-down member 48. When the blades contact the nearest radial membrane M of the grapefruit, they are turned so that the cutting edge of each blade is pointed radially outwardly of the grapefruit. The blades of the first sectionizing head are then moved radially outwardly past the periphery of the grapefruit as indicated in heavy lines in FIG. 2.

Similarly, blades 28a, 28b, 28c, 28d, 28e, and 28f (FIG. 3) of sectionizing head 28 are disposed at 60 degree intervals around a hold-down member 48a with blades 28a and 28f disposed 30 degrees on opposite sides of a radial plane 51 extending through the axis of the main turret and the center of the cylindrical hold-down member 48a. The blades of head 28 are moved down into the grapefruit, and then tangentially in a clockwise direction (FIG. 3) to engage the nearest radial membrane M. When the blades contact the membranes, the blades are turned and moved radially out through the grapefruit to a point past the periphery of the grapefruit.

The third sectionizing head 30 comprises a plurality of blades 30a, 30b, 30c, 30d, 30e and 30f disposed at 60 degree intervals around a cylindrical hold-down member 48b to which the blades are substantially tangent. The blade 30a is disposed 45 degrees clockwise from a radial plane 52 passing through the center of the turret and the center of the head, while the blade 30f is disposed 15 degrees counterclockwise from said plane. When the tool carrier 22 is moved downwardly, each blade penetrates down into the grapefruit and is then moved in a generally counterclockwise direction (FIG. 4) toward engagement with the nearest membrane M. Each blade is then turned and moved radially outwardly of the grapefruit to a point approximately half way to the periphery of the fruit. The blades are then moved upwardly out of the grapefruit, as by raising the tool carrier 22 to its initial elevated position.

The fourth head 32 has six blades 32a, 32b, 32c, 32d, 32e and 32f disposed at 60 degree intervals in a circular pattern around a central cylindrical hold-down member 48c. The blade 32a is disposed 15 degrees clockwise (FIG. 5) from a radial plane 53 passing through the center of the main turret and through the center of the head, and the blade 32f is disposed 45° counterclockwise from said radial plane. When the tool carrier is lowered, the blades of the fourth head 32 are moved down into the fruit and are then moved in a counterclockwise direction (FIG. 5) toward engagement with the adjacent membranes M. If the fruit is in a relatively firm condition and the membrane does not yield when contacted by the blade, the blade is turned and moved radially outwardly toward and past the periphery of the grapefruit. If the grapefruit is in a loosened condition and the membrances yield when contacted by the blades, the blades are not turned, but are moved along a sweeping arc, as seen in FIG. 5, until the blades are past the periphery of the grapefruit.

A particular feature of the present invention resides in the concept of moving the blades of the third head 30 only approximately half way out to the periphery of the fruit. It was found that, if the blades of this head were moved past the periphery of the fruit, the fruit would reach the fourth head 32 in such a loosened condition that the blades of the fourth head could not carry out their necessary function of cutting loose the radial membranes of the fruit. It is to be noted that the blades of the first two heads are moved clockwise or forwardly, to engage radial membranes which will be referred to as forward membranes FM. On the other hand, the blades of the heads 30 and 32 are moved counterclockwise, or rearwardly, to engage and cut loose rearward radial membranes RM. It is of course desirable that the same number of rearward and forward membranes be cut loose by the blades since each meat segment is attached to both a rearward and a forward membrane. Accordingly, it is necessary that the blades of the fourth head 32 are permitted to carry out their cutting operation. The step of the method of the present invention wherein the blades of the third head are moved only part way to the periphery of the fruit makes possible a complete, efficient grapefruit sectionizing operation.

After the grapefruit has been processed by the four sectionizing heads, the grapefruit is engaged by a plurality of rods or blades 60 (FIG. 1) carried by the rotary stripper unit 34. These stripper rods project downwardly and are arranged to take up positions adjacent to but radially outwardly of the apices of the several meat segments of the grapefruit. Then, when the stripper unit is rotated, the blades contact the membranes M and force them to a position wrapped around the core of grapefruit. As the membranes are forced inwardly, the meat segments are stripped from the membranes. It will be particularly noted that the blades of the stripper break the connections that remain due to the fact that the cuts made by the blades of the third head 30 extend only half way to the periphery of the fruit. Accordingly, it is evident that the cuts made by the blades of the third head must be extensive enough so that the remaining connection may be broken by the stripper blades, but not so extensive as to loosen the grapefruit to a degree that would prevent the effective operation of the blades of the fourth head. The movement of the blades approximately half way to the periphery of the fruit has been found to give satisfactory results. In other forms of the method of the present invention, the partial cutting operation is carried out in different sequences relative to the full cutting operations. For example, the partial cutting may be carried out at either the first head or the second head, instead of at the third head, while full cutting operations are performed at the remaining heads. In another from the method is carried out by making the partial cutting stroke along a forward membrane adjacent a wedge-shaped segment rather than along a rear membrane. Also it is within the scope of the present invention to maintain the compactness of the fruit by stopping all cutting strokes short of the periphery of the grapefruit and then breaking the remaining connections by the spinner blades. In such a method the length of the strokes should be such that only small connecting portions, which can be easily broken by the spinner, remain.

In the following claims the term "forwardly" will be used to indicate the direction of movement of the blades of the first two heads 26 and 28 as the blades move toward engagement with "forward" radial membranes of the wedge-shaped meat segments of the grapefruit. Similarly, the term "rearwardly" will be used to indicate the direction of movement of the blades of the third and fourth heads as they move toward contact with "rearward" radial membranes of the meat segments.

While I have described one particular procedure for carrying out the advantageous method of the present invention, it will be understood that some variations may be made without departing from the scope of the novel concepts of the invention.

Having thus described my invention, what I claim as new and desire to protect by Letters Patent is:

1. A method of removing the meat segments of a peeled grapefruit from the enclosing radial membranes comprising the steps of holding a peeled grapefruit in fixed position, rupturing the bond between one radial face and the adjacent radial membrane of each of a plurality of meat segments, rupturing approximately one half the bond between the opposite face of the meat segment and the adjacent radial membrane of a portion of said plurality of segments, rupturing the bond between the opposite face of the meat segment and the adjacent radial membrane of the remainder of said plurality of segments, and stripping all segments from the associated membranes.

2. A method of removing the meat segments of a peeled grapefruit from the enclosing radial membranes comprising the steps of holding the peeled grapefruit in fixed position, rupturing the bond between one radial face and the adjacent radial membrane of a plurality of meat segments, rupturing approximately one half the bond between the opposite face of the meat segment and the adjacent radial membrane of approximately one half of said plurality of segments, rupturing the bond between the radial membrane and the opposite face of the other half of said plurality of segments, and stripping all segments from the associated membranes.

3. A method of separating the wedge-shaped meat segments of a peeled grapefruit from the enclosing radial membranes comprising the steps of holding the peeled grapefruit in fixed position, making a cut between one radial face and the adjacent radial membrane of a plurality of meat segments, said cut extending from a point adjacent the apex of each wedge-shaped segment to and past the periphery of the grapefruit, making a cut between the radial membrane and the opposite radial face of a portion of said plurality of segments, said cut extending from the apex of the segments approximately half way to the periphery of the grapefruit, making a cut between the radial membrane and the opposite radial face of the remainder of said plurality of segments, said cut extending from the apex of the segments to and past the periphery of the grapefruit, and stripping the meat segments from said membranes.

4. A method of removing the wedge-shaped meat segments of a grapefruit from the grapefruit core and from the radial membranes enclosing the segments comprising the steps of holding a peeled grapefruit in fixed position, loosening the grapefruit segments from the core and the membranes by a series of radial cuts, a portion of said cuts being made between radial faces of the meat segments and the adjacent radial membranes from points adjacent the apices of the meat segments to the periphery of the grapefruit and the remainder of said cuts being made between radial faces of the meat segments and the adjacent membranes from points adjacent the apices to points approximately half way out to the periphery of the fruit, and stripping the meat segments from the membrane.

5. A method of removing the wedge-shaped meat segments of a grapefruit from the enclosing radial membranes comprising the steps of loosening the meat segments from the membranes by radial cuts made adjacent one radial membrane of each of the segments from a point adjacent the apex of the segment to the periphery of the grapefruit and then adjacent the opposite radial membrane extending from adjacent the apex to a point approximately half way to the periphery, and forcing the loosened meat segments away from the radial membranes.

6. A method of removing meat segments of a peeled citrus fruit from the enclosing radial membranes comprising the steps of holding the fruit in a fixed position, making a cut between one radial face and the adjacent radial membrane of each of a plurality of segments, said cut extending from a point adjacent the apex of each segment to the periphery of the fruit, making a cut between the opposite radial face and its adjacent membrane of a portion of each of said plurality of segments, said cut extending from the apex of the segments approximately halfway to the periphery of the fruit, making a cut between the opposite radial face and its adjacent membrane of the remainder of each of said plurality of segments, said cut extending from the apex of the segments to the periphery of the fruit, and stripping the meat segments from said membranes.

References Cited in the file of this patent
UNITED STATES PATENTS 2,558,579    Polk et al. _____ June 26, 1951
2,607,381    Polk et al. _____ Aug. 19, 1952